Patented Nov. 26, 1946

2,411,524

UNITED STATES PATENT OFFICE 2,411,524

PROCESS FOR THE PRODUCTION OF ZIRCONIUM HYDRIDE

Lewis W. Davis, Peabody, Mass., assignor to Metal Hydrides Incorporated, Beverly, Mass., a corporation of Massachusetts No Drawing. Application October 4, 1943, Serial No. 504,908

6 Claims. (Cl. 23—204)

It is known in the art that zirconium oxide can be readily reduced to metal with calcium, yet on account of the high cost of calcium metal attempts have been made in the past to reduce zirconium oxide with magnesium. And under certain conditions such a reduction was partly successful. However, in all cases the resulting metal was contaminated with magnesium which readily alloys with zirconium metal at the temperature of reduction.

Attempts to produce pure zirconium metal by reduction with magnesium whether in vacuum, hydrogen, or in inert gas such as helium, never gave material free from magnesium and therefore at present magnesium, in spite of numerous attempts, is not used as a reducing reagent for the production of pure zirconium.

I have found, however, that if instead of attempting to produce zirconium metal, the conditions are regulated so that the first product of reduction will be zirconium hydride, different results can be obtained if a proper sequence of different operations is observed.

My preferred method of operation consists in mixing dried zirconium oxide with freshly cut chips or filings of pure magnesium metal in substantially molal proportions with an excess of magnesium in the order of ten per cent. The charge of these powdered materials thoroughly mixed together is placed in a retort, provided with a gas-tight cover and the necessary pipings connecting it with a vacuum system and a supply of hydrogen.

After evacuating all the air from the retort and the interstices in the powdered charge, the retort is then filled with pure dry hydrogen to a pressure of about fifteen pounds per square inch and slowly heated to bring the charge gradually to a temperature of 660° C., for example. At that temperature magnesium sublimes or evaporates in a hydrogen atmosphere. Both magnesium vapor in sublimed form and hydrogen then come in contact with the particles of zirconium oxide. Magnesium vapor in sublimed form reduces the particles on the surface and since the temperature is sufficiently low, zirconium hydride is instantly formed covering the whole grain with a layer of zirconium hydride.

It has been known for some time that magnesium sublimes at a temperature substantially below its boiling point, 1110° C. Under ordinary conditions, magnesium in fact begins to sublime at a temperature below its melting point, 651° C. In the practice of the invention, I prefer to take advantage of these lower temperatures because the sublimed magnesium vapor tends to remain longer in the charge, thus facilitating the desired reaction, and the equipment is subjected to less wear and tear, not to mention the economy in fuel used to provide the heat.

Zirconium hydride, as with many other metallic hydrides, is a chemical compound with properties very different from the zirconium metal. The chemical affinity of the metal is partly satisfied by alloying or combining with hydrogen. So that the resulting compound ($ZrH_4$) has little affinity left for other elements with which it may come in contact.

If at this stage the operation is interrupted, the zirconium oxide will appear not as a white oxide but as a black powder which on heating will give up a certain amount of hydrogen, demonstrating the fact that the surface of every grain has been transformed into zirconium hydride.

However, if the heating is continued with a gradual elevation of temperature from 600° C. to 800° C., an additional amount of sublimed magnesium vapor will come in contact with zirconium hydride without alloying with it and will diffuse through it to the deeper layers of unreduced zirconium oxide. The temperature is still below the dissociation of zirconium hydride at that pressure of hydrogen so that the incoming sublimed magnesium vapor will not alloy with that material. Heating to a still higher temperature will bring the remaining amount of sublimed magnesium vapor necessary for the final reduction of zirconium oxide to the center of each grain after which the hydrogen reacts with the reduced zirconium to convert it to zirconium hydride.

The dissociation of zirconium hydride into zirconium metal and hydrogen is a function of temperature and hydrogen pressure. For instance, if zirconium hydride is heated to a temperature of 900° C. in a retort connected with a vacuum pump, it is dissociated almost entirely into metallic zirconium and hydrogen since the evolving hydrogen will be continually withdrawn by the pump and the pressure of that gas above the zirconium hydride will be very low indeed. If hydrogen is merely passed over or maintained at normal pressure the dissociation will also be very pronounced. However, if the hydrogen pressure is appreciably higher than normal, in the order of ten to fifteen pounds per square inch, the dissociation of zirconium hydride is retarded. So that even at a temperature of 900° C., the zirconium hydride is only partially dissociated, and the contamination with magnesium is low.

After completion of the reduction in hydrogen at increased pressure, the furnace is connected with the vacuum pumps and all free hydrogen is evacuated. During this operation the remaining amount of magnesium in the charge is quickly evaporated and condensed in a cooler part of the retort removed from the charge. During this vacuum treatment of the charge, any traces of magnesium which might have alloyed with the partly dissociated zirconium hydride will be evaporated.

If it is desired to obtain zirconium metal as a final product the charge is cooled in vacuum. However, if it is desired to obtain zirconium hydride, the hydrogen is readmitted in the retort while the charge is still at red heat and the cooling is carried on in a hydrogen atmosphere. During that period the hydrogen will be absorbed by the zirconium metal and transformed into zirconium hydride. After cooling the charge is removed from the furnace, broken into pieces of three to four inches in diameter which then are crushed in a jaw crusher to a mixture of powder and small pieces of one quarter inch or less. This crushing operation is easily carried out since due to the vacuum treatment all the magnesium is evaporated from the charge which is then left in the state of spongy brittle matter.

Summarizing the description it can be stated that my method depends on a sequence of definite steps, neither of which by itself is sufficient to produce the desired results, but the combination of these steps and the proper sequence assures the results which otherwise could not be accomplished.

My method gives excellent results in the production of zirconium. Yet it is limited in scope and cannot be applied with the same success to the production of other hydrides. The principal reason for this is that magnesium does not form a stable compound with zirconium oxide, which is not the case when other oxides are used. In the case of titanium oxide, for instance, the magnesium vapor alloys with the titanium oxide forming a stable salt ($MgTiO_3$) which prevents the further reduction of titanium oxide with magnesium.

What I claim as new and desire to secure by Letters Patent of the United States is:

1. A method of production of zirconium hydride consisting of the following steps; mixing zirconium oxide with magnesium chips or powder in molal proportions with only a limited excess of magnesium, placing the charge in a closed retort, evacuating all the air from the retort and the charge and replacing it with hydrogen, increasing the pressure of hydrogen appreciably above the atmospheric pressure, gradually heating the charge to a temperature of 660° C., continuing the heating until the temperature of the charge has reached at least 900° C., withdrawing all the hydrogen from the retort and establishing a vacuum, continuing the heating until all traces of free magnesium are evaporated from the charge, readmitting hydrogen in the retort and cooling the charge in a hydrogen atmosphere which is continually supplied to it until the charge is at room temperature.

2. A method of production of zirconium hydride consisting of the following steps; mixing zirconium oxide with magnesium chips or powder in molal proportions with only a limited excess of magnesium, placing the charge in the closed retort, evacuating all the air from the retort and the charge and replacing it with hydrogen, increasing the pressure of hydrogen appreciably above the atmospheric pressure, gradually heating the charge to a temperature in the order of that of the melting point of magnesium, continuing the heating until the temperature of the charge is considerably above the melting point of magnesium, withdrawing all the hydrogen from the retort and establishing a vacuum, continuing the heating until all the traces of free magnesium are evaporated from the charge, readmitting hydrogen in the retort and cooling the charge in a hydrogen atmosphere which is continually supplied to it until the charge is at room temperature.

3. In the production of zirconium hydride, the improvement which comprises heating a charge of intimately admixed zirconium oxide and excess metallic magnesium in a reaction zone in the presence of hydrogen gas to a temperature sufficiently high to reduce the zirconium oxide and to convert the resulting metallic zirconium to zirconium hydride, the charge being gradually elevated in temperature so that the zirconium oxide particles are first reduced and hydrided at their surface and then in their interior, evacuating the heated reaction zone and resulting reaction mass to remove hydrogen gas therefrom, distilling the excess metallic magnesium and condensing it in a zone removed from the reaction mass while the reaction zone is still under vacuum to keep the metallic magnesium out of contact with the zirconium and hence to prevent it from alloying with the zirconium, readmitting hydrogen gas to the heated reaction zone and reaction mass, converting reduced zirconium present in the reaction mass to zirconium hydride with the newly admitted hydrogen gas, and cooling the final reaction mass containing the zirconium hydride in the presence of the hydrogen gas.

4. In the production of zirconium hydride, the improvement which comprises evacuating a charge of intimately admixed zirconium oxide and excess metallic magnesium in a reaction zone to remove objectionable air, admitting hydrogen gas to the reaction zone and charge, heating the charge to a temperature sufficiently high to reduce the zirconium oxide and to convert the resulting metallic zirconium to zirconium hydride, the charge being gradually elevated in temperature so that the zirconium oxide particles are first reduced and hydrided at their surface and then in their interior, evacuating the heated reaction zone and resulting reaction mass to remove hydrogen gas therefrom, distilling the excess metallic magnesium and condensing it in a zone removed from the reaction mass to keep the metallic magnesium out of contact with the zirconium and hence to prevent it from alloying with the zirconium, readmitting hydrogen gas to the heated reaction zone and reaction mass, converting reduced zirconium present in the reaction mass to zirconium hydride with the newly admitted hydrogen gas, and cooling the final reaction mass containing the zirconium hydride in the presence of the hydrogen gas.

5. In the production of zirconium hydride, the improvement which comprises evacuating a charge of intimately admixed zirconium oxide and excess metallic magnesium in a reaction zone to remove objectionable air, admitting hydrogen gas to the reaction zone and charge under substantial positive pressure, heating the charge to a temperature sufficiently high to reduce the zirconium oxide and to convert the resulting metallic zirconium to zirconium hydride, the charge being gradually elevated in temperature so that the zirconium oxide particles are first reduced and hydrided at their surface and then in their interior, evacuating the heated reaction zone and resulting reaction mass to remove hydrogen gas therefrom, distilling the excess metallic magnesium and condensing it in a zone removed from the reaction mass to keep the metallic magnesium out of contact with the zirconium and hence to prevent it from alloying with the zirconium, readmitting hydrogen gas to the heated reaction zone and reaction mass, converting reduced zirconium present in the reaction mass to zirconium hydride with the newly admitted hydrogen gas, and cooling the final reaction mass containing the zirconium hydride in the presence of the hydrogen gas.

6. In the production of zirconium hydride, the improvement which comprises evacuating a charge of intimately admixed zirconium oxide and excess metallic magnesium in a reaction zone to remove objectionable air, admitting hydrogen gas to the reaction zone and charge under substantial positive pressure, heating the charge to a temperature sufficiently high to reduce the zirconium oxide and to convert the resulting metallic zirconium to zirconium hydride, the charge being gradually elevated in temperature so that the zirconium oxide particles are first reduced and hydrided at their surface and then in their interior, evacuating the heated reaction zone and resulting reaction mass to remove hydrogen gas therefrom, distilling the excess metallic magnesium and condensing it in a zone removed from the reaction mass to keep the metallic magnesium out of contact with the zirconium and hence to prevent it from alloying with the zirconium, readmitting hydrogen gas to the heated reaction zone and reaction mass under substantial positive pressure, converting reduced zirconium present in the reaction mass to zirconium hydride with the newly admitted hydrogen gas, and cooling the final reaction mass containing the zirconium hydride in the presence of the hydrogen gas.

LEWIS W. DAVIS.